United States Patent [19]
Yoder

[11] Patent Number: 5,180,221
[45] Date of Patent: Jan. 19, 1993

[54] APPARATUS AND METHOD FOR ILLUMINATING A LIQUID FILLED CONTAINER

[76] Inventor: Brant Yoder, 665 Castle Cliff, Ballwin, Mo. 63021

[21] Appl. No.: 649,957

[22] Filed: Feb. 4, 1991

[51] Int. Cl.[5] ............................................. F21V 33/00
[52] U.S. Cl. ............................. 362/101; 362/109; 362/183; 362/234; 362/800; 33/348.2
[58] Field of Search ............. 33/348.2; 362/101, 109, 362/120, 183, 184, 200, 234, 251, 800

[56] References Cited

U.S. PATENT DOCUMENTS

| | | | |
|---|---|---|---|
| 1,760,727 | 5/1930 | Von Hofe . | |
| 2,367,858 | 1/1945 | Flynn | 362/32 X |
| 2,511,525 | 6/1950 | Bradwell et al. | 33/206 |
| 2,543,572 | 2/1951 | Friberg | 362/184 |
| 2,752,693 | 7/1956 | Wullschleger | 33/211 |
| 2,790,069 | 4/1957 | Alexander | 362/398 X |
| 2,825,144 | 3/1958 | Warden, Sr. et al. | 33/348 |
| 2,944,144 | 7/1960 | Naylor | 240/6.44 |
| 3,046,672 | 7/1962 | Lace | 33/348 |
| 3,192,375 | 6/1965 | Olson | 33/348 X |
| 3,204,233 | 8/1965 | Olliff | 340/282 |
| 3,233,235 | 2/1966 | Wright | 340/282 |
| 3,584,212 | 6/1971 | Hansen | 362/802 X |
| 3,724,087 | 4/1973 | Ostrager | 33/348 X |
| 3,786,472 | 1/1974 | Scopacasa | 340/282 |
| 3,863,067 | 1/1975 | Gooley | 250/231 R |
| 3,878,618 | 4/1975 | Freeman | 33/379 |
| 3,885,145 | 5/1975 | Wise | 362/183 X |
| 4,003,134 | 1/1977 | Adams | 33/348 |
| 4,079,521 | 3/1978 | Uhorczak | 33/366 |
| 4,244,117 | 1/1981 | Cantarella et al. | 33/366 |
| 4,407,075 | 10/1983 | MacDermott et al. | 33/348.2 |
| 4,703,315 | 10/1987 | Bein et al. | 340/689 |
| 4,720,920 | 1/1988 | Tudek | 33/366 |
| 4,876,798 | 10/1989 | Zimmerman | 33/348.2 |
| 5,020,232 | 6/1991 | Whiteford | 33/348.2 |

FOREIGN PATENT DOCUMENTS

| | | |
|---|---|---|
| 750088 | 5/1943 | Fed. Rep. of Germany . |
| 3035686 | 5/1982 | Fed. Rep. of Germany ..... 33/348.2 |

*Primary Examiner*—Stephen F. Husar
*Attorney, Agent, or Firm*—Heller & Kepler

[57] ABSTRACT

An illuminated liquid filled container preferably for construction applications to provide a lighted level, has a liquid filled leveling container with an associated source of illumination. The liqud filled containers includes a light source to illuminate the liquid and a level bubble.

32 Claims, 1 Drawing Sheet

APPARATUS AND METHOD FOR ILLUMINATING A LIQUID FILLED CONTAINER

BACKGROUND OF THE INVENTION

1. Field of the Invention

Through the recorded use of leveling devices, it has been difficult to read the device under low light conditions. This is especially so when the level is used in places where it is difficult or impossible to place an exterior light source into the level location and onto the level. Many devices have been developed to attempt to illuminate the spirit vials used in most levels. Usually the approach used is to utilize a lamp to throw light onto the outer surface of the container.

2. Description of the Related Art

U.S. Pat. No. 2,367,858 to T. W. Flynn on Jan. 23, 1945 shows an illuminated level having a lucite rod that conducts light from a light source to place light in the vicinity of a spirit level bubble glass.

U.S. Pat. No. 2,543,572 to C. A. Friberg on Feb. 27, 1951 describes an illuminated spirit level that has a battery recessed into a web portion of the level body. The battery powers a lamp near the spirit level to illuminate the spirit level. A manual switch is provided.

U.S. Pat. No. 2,790,069 to G. G. Alexander on Apr. 23, 1957 shows a lamp so placed as to illuminate all the spirit levels shown at the same time. The lamps are battery powered. A thumb screw is used to hold the battery in place and acts as a switch.

U.S. Pat. No. 2,825,144 to J. W. Warden, Sr., et al, on Mar. 4, 1958 describes an illuminated combination level that provides a lamp, a battery and a switch. The light illuminates the level tubes. The level is substantially transparent between the lamp and the level tubes.

U.S. Pat. No. 3,046,672 to H. S. Lace on Jul. 31, 1962 shows a level that includes a light and a switch for activating the light and illuminating the bubble elements whenever the level is held against a structural member. A manual switch is also provided.

U.S. Pat. No. 3,192,375 to E. P. Olson on Jun. 29, 1965 describes an illuminated level that has a lamp located between pair of liquid columns to illuminate the columns. A battery to power the lamp and a switch are situated within the web of the level frame.

U.S. Pat. No. 3,584,212 to W. Hansen on Jun. 8, 1971 shows an illuminated spirit level that has a plurality of light sources to illuminate level containers. There is a ball-type gravity switch to activate selective lamps depending on the orientation of the level. There is a manual switch to terminate power to the lamps.

U.S. Pat. No. 3,724,087 to S. A. Ostrager on Apr. 3, 1973 describes a spirit level with translucent spirit vial housings that allows the transmittal of light to the vials.

None of these patents reveal the apparatus described herein that has a light source such as an LED enclosed within the container.

SUMMARY OF THE INVENTION

The apparatus described herein is shown placed within a level housing but the apparatus could be used to illuminate any liquid filled object that will transmit light such as a toy that requires illumination of a selected portion.

An apparatus for illuminating a liquid filled container has at least one container containing a liquid, a means to illuminate the container and the liquid enclosed within the container and a means to activate the means to illuminate connected to the container.

An apparatus for illuminating a liquid filled container has at least one container containing a liquid and a bubble within the container, at least one light source enclosed within the container to illuminate the container, the liquid and the bubble and a power source connected to the light source to activate the light source. The container could be of any shape including, among others, straight cylindrical (as shown), a tubular ring or a cylindrical tanklike container like those used on surveyor's transits.

An apparatus for illuminating a liquid filled container may have, as the light source, at least one LED or at least one incandescent bulb. There may be a circuit partly enclosed within the container. The power source may be a DC power source. There may be a double pole-triple throw switch in the circuit to direct current flow to all of the LEDs or incandescent bulbs, to interrupt current flow to all of the LEDs or bulbs and to direct current flow to only one LED or bulb from the DC power source. The DC power source may be at least one DC battery. There may be a DC battery charger detachably connected to the circuit to charge the DC batteries. The DC battery charger may also be an integral part of the circuit.

An apparatus for illuminating a liquid filled leveling container placed within a level has a level housing and at least one container, within the level housing, containing a liquid and a bubble enclosed within the liquid. There is a circuit partly enclosed within the container and partly within the level housing. At least one LED or incandescent bulb is connected to the circuit and enclosed within the container to illuminate the container, the liquid and the bubble. There is at least one DC battery, within the level housing, that is connected to the circuit to provide current the LED or bulb. There is a double pole-triple throw switch in the circuit to direct current flow to all of the LEDs or incandescent bulbs, to interrupt current flow to all of the LEDs or bulbs and to direct current flow to only one LED or bulb from the DC power source.

There may be a DC battery charger detachably connected to the circuit to charge the DC batteries. The DC battery charger may be an integral part of the circuit.

There may also be at least one exterior LED or incandescent bulb in the circuit to project a light to illuminate an area outside the level housing. This is the one LED or bulb mentioned with the switch.

A method for illuminating a liquid filled container has, among others, the following steps: having at least one container containing a liquid and a bubble within the liquid; partly enclosing a circuit within the container; and enclosing at least one LED or incandescent bulb within the container, connected to the circuit, to illuminate the container, the liquid and the bubble.

Other steps of the above method include: connecting at least one DC battery to the circuit to provide current the LED or bulb; placing a double pole-triple throw switch in the circuit to direct current flow to all of the LEDs or incandescent bulbs, to interrupt current flow to all of the LEDs or bulbs and to direct current flow to only one LED or bulb from the DC power source; and detachably connecting an AC to DC battery charger to the circuit to charge the DC batteries.

A method for illuminating a liquid filled leveling container placed within a level include the following steps: having a level housing; placing at least one container, within the level housing, containing a liquid and a bubble enclosed within the liquid; partly enclosing a circuit within the container and partly within the level housing; and enclosing at least one LED or incandescent bulb within the container, connected to the circuit, to illuminate the container, the liquid and the bubble. Other steps are: connecting at least one DC battery to the circuit, within the level housing, to provide current the LED or bulb; placing a double pole-triple throw switch in the circuit to direct current flow to all of the LEDs or incandescent bulbs, to interrupt current flow to all of the LEDs or bulbs and to direct current flow to only one LED or bulb from the DC power source; detachably connecting an AC to DC battery charger to the circuit to charge the DC batteries; and using at least one exterior LED or exterior incandescent bulb to illuminate an area outside the level housing.

It is an object of this invention to provide a method and an apparatus to illuminate a liquid filled container or container in order that the liquid within the container, the container and a bubble within the container, if there is one, can be more easily seen in low light conditions.

It is another object of this invention to place the apparatus into a leveling apparatus to aid in the leveling process and to provide a method of using the apparatus in the level.

DESCRIPTION OF THE PREFERRED EMBODIMENT

Figure 1:
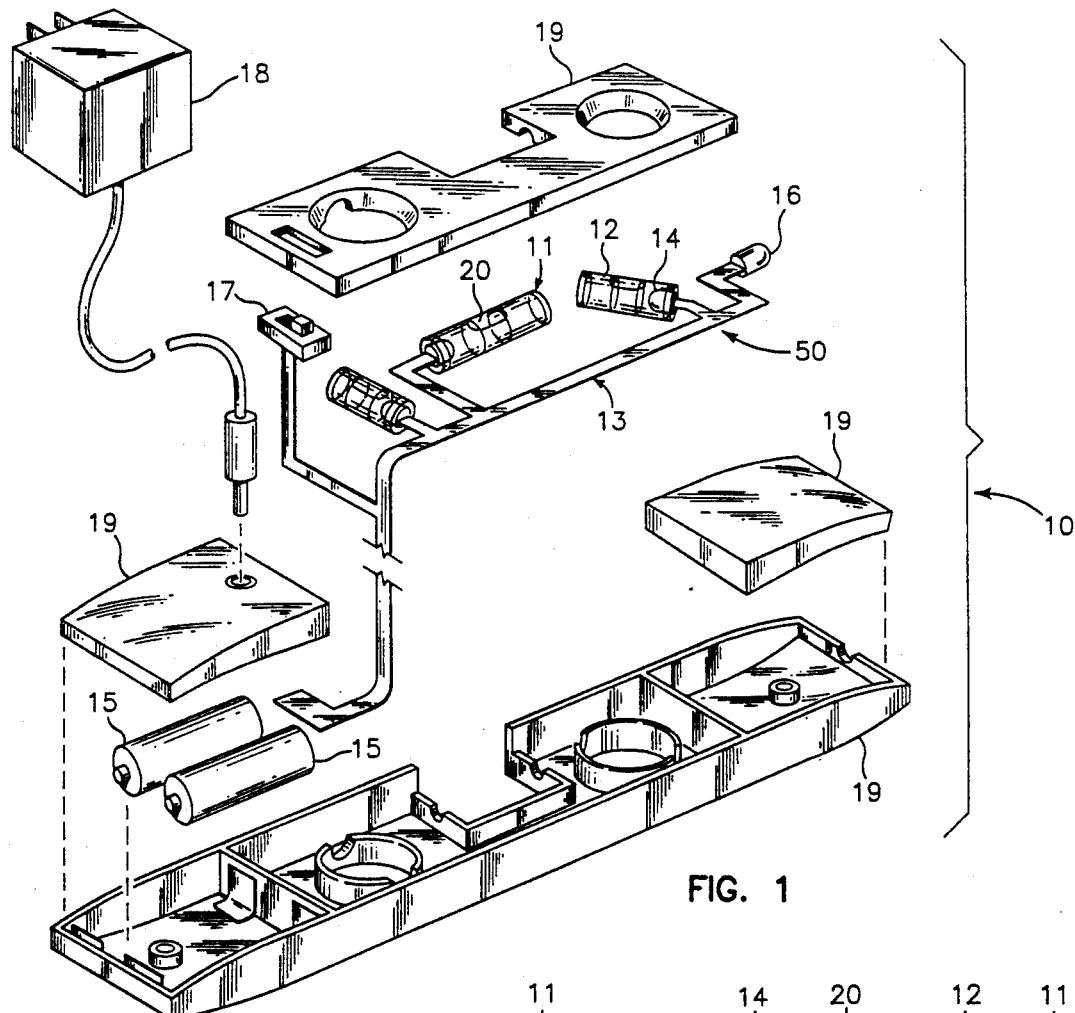
FIG. 1 is an exploded perspective view of an apparatus for illuminating a liquid filled container with the apparatus placed within a level housing.
Figures 3, 4, 5:
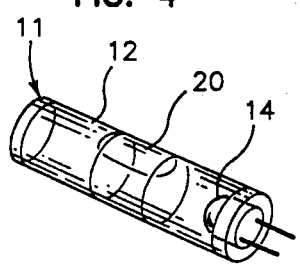
FIG. 3 is an end view of the LED or incandescent bulb sealed within the liquid filled container and showing the connections to connect to the circuit.
FIG. 4 is a side view of the LED or incandescent bulb sealed within the liquid filled container and showing the connections to connect to the circuit.
FIG. 5 is a perspective view of the LED or incandescent bulb sealed within the liquid filled container and showing the connections to connect to the circuit.
Figure 2:
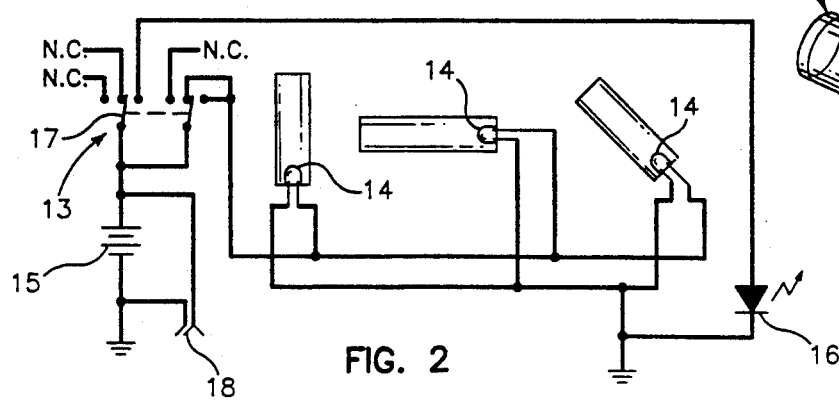
FIG. 2 is a circuit schematic of the apparatus for illuminating a container, a liquid within the container and a bubble within the liquid. The circuit shows the sign indicating an LED but an incandescent bulb could be shown also.

An apparatus 50 for illuminating a liquid filled leveling container 11 placed within a level has a level housing 19. There is at least one container 11, within the level housing 19, containing a liquid 12 and a bubble 20 enclosed within the liquid 12. A circuit 13 is partly enclosed within the container 11 and partly within the level housing 19. There is at least one LED or incandescent bulb 14, connected to the circuit 13 and enclosed within the container 11, to illuminate the container 11, the liquid 12 and the bubble 20. There is an exterior LED or incandescent bulb 16 in the circuit 13 to indicate to the user that the DC current is flowing to the LED's 14 in the containers 11 from the batteries 15 or that may be used to project a light to illuminate an area outside the level housing 19. At least one DC battery 15 is enclosed within the level housing 19 and is connected to the circuit to provide current the LEDs or bulbs 14 and 16. There is a double pole-triple throw switch 17 in the circuit 13 to direct current flow to all of the LEDs or incandescent bulbs 14 and 16, to interrupt current flow to all of the LEDs or bulbs 14 and 16 and to direct current flow to only one LED or bulb 16 from the DC power source 15. An AC to DC battery charger 18 is detachably connected to the circuit 13 to charge the DC battery or batteries 15.

An alternative embodiment of the apparatus 10 may not be housed within a level housing and is described as apparatus 50. Both apparatus 10 and apparatus 50 are shown in the drawings. An apparatus 50 for illuminating a liquid filled container 11 has at least one container 11 containing a liquid 12 and a circuit 13 partly enclosed within the container 11. There is at least one LED or incandescent bulb 14, connected to the circuit 13 and enclosed within the container 11, to illuminate the container 11 and the liquid 12. There could be a bubble 20 in the liquid 12 and that bubble could also be illuminated. There is an exterior LED or incandescent bulb 16 in the circuit 13 to indicate to the user that the DC current is flowing to the LEDs or bulbs 14 in the containers 11 from the batteries 15 or to provide a light to illuminate an area outside the circuit. At least one DC battery 15 is connected to the circuit 13 to provide current the LEDs or bulbs 14 and 16. There is a double pole-triple throw switch 17 in the circuit 13 to direct current flow to all of the LEDs or incandescent bulbs 14 and 16, to interrupt current flow to all of the LEDs or bulbs 14 and 16 and to direct current flow to only one LED or bulb 16 from the DC power source 15. There is an AC to DC battery charger 18 detachably connected to the circuit 13 to charge the DC battery or batteries 15.

An method for illuminating a liquid filled leveling container placed within a level comprises, among others, the following steps: having a level housing 19; placing at least one container 11, within the level housing 19, the container 11 containing a liquid 12 and a bubble 20 enclosed within the liquid 12; and partly enclosing a circuit 13 within the container 11 and partly within the level housing 19.

Other steps in the method are: enclosing at least one LED or incandescent bulb 14 within the container 11, the LED or bulb connected to the circuit 13, to illuminate the liquid 12; placing an exterior LED or bulb 16 in the circuit 13 to indicate to the user that the DC current is flowing to the LED's 14 in the containers 11 from the batteries 15 or to project a light to illuminate an area outside the level housing 19; connecting at least one DC battery 15 to the circuit 13, within the level housing 19, to provide current the LEDs or bulbs 14 and 16; placing a double pole-triple throw switch 17 in the circuit to direct current flow to all of the LEDs or incandescent bulbs 14 and 16, to interrupt current flow to all of the LEDs or bulbs 14 an 16 and to direct current flow to only one LED or bulb 16 from the DC power source 15; and detachably connecting an AC to DC battery charger 18 to the circuit 13 to charge the DC battery or batteries 15.

The foregoing descriptions and drawings of the invention are explanatory and illustrative only, and various changes in shape, sizes and arrangements of parts as well certain details of the illustrated construction may be made within the scope of the appended claims without departing from the true spirit of the invention.

I claim:

1. An apparatus for illuminating a liquid filled container comprising:
   a. a plurality of containers containing a liquid and a bubble within the liquid;
   b. a means to selectively illuminate each container and the liquid the means to illuminate enclosed within the container of liquid to illuminate the container, the liquid and the bubble;
   c. a means to selectively activate the means to illuminate operatively connected to the means to illuminate the container;
   d. a power source connected to the means to illuminate to activate the means to illuminate; and
   e. a means for connecting the power source, the means to selectively activate the means to illuminate, and the means to illuminate partly enclosed within the container.

2. An apparatus for selectively illuminating a liquid filled container as set forth in claim 1 wherein the means to illuminate is a light source.

3. An apparatus for selectively illuminating a liquid filled container as described in claim 2 wherein the light source comprises at least one LED.

4. An apparatus for selectively illuminating a liquid filled container as described in claim 2 wherein the light source comprises at least one incandescent bulb.

5. An apparatus for selectively illuminating a liquid filled container as described in claim 1 further comprising a circuit partly enclosed within the container.

6. An apparatus for selectively illuminating a liquid filled container as described in claim 1 wherein the power source comprises a DC power source.

7. An apparatus for selectively illuminating a liquid filled container as described in claim 1 further comprises a means for charging the power source.

8. An apparatus for selectively illuminating a liquid filled container as described in claim 5 further comprises a double pole-triple throw switch in the circuit to direct current flow to the means to illuminate, to interrupt current flow to the means to illuminate and to direct current flow to only one of the means to illuminate.

9. An apparatus for illuminating a liquid filled container comprising:
   a. at least one container containing a liquid and a bubble within the liquid;
   b. a circuit partly enclosed within the container;
   c. at least one LED, connected to the circuit and enclosed within the container, to illuminate the container, the liquid and the bubble;
   d. a DC power source connected to the circuit to provide current to the LED;
   e. a double pole-triple throw switch in the circuit to direct current flow to all of the LEDs, to interrupt current flow to all of the LEDs and to direct current flow to only one LED from the DC power source; and
   f. a means for charging the DC power source.

10. An apparatus for illuminating a liquid filled container comprising:
    a. at least one container containing a liquid and a bubble within the liquid;
    b. a circuit partly enclosed within the container;
    c. at least one incandescent bulb, connected to the circuit and enclosed within the container, to illuminate the container, the liquid and the bubble;
    d. a DC power source connected to the circuit to provide current to the bulb;
    e. a double pole-triple throw switch in the circuit to direct current flow to all of the LEDs, to interrupt current flow to all of the LEDs and to direct current flow to only one LED from the DC power source; and
    f. a means for charging the DC power source.

11. An apparatus for illuminating a liquid filled container comprising:
    a. at least one container containing a liquid and a bubble within the container;
    b. a circuit partly enclosed within the container;
    c. at least one LED, connected to the circuit and enclosed within the container, to illuminate the container, the liquid and the bubble;
    d. a DC power source connected to the circuit to provide current the LED; and
    e. a double pole-triple throw switch in the circuit to direct current flow to all of the LEDs, to interrupt current flow to all of the LEDs and to direct current flow to only one LED from the DC power source.

12. An apparatus for illuminating a liquid filled container wherein the DC power source as described in claim 11 comprises at least one DC battery.

13. An apparatus for illuminating a liquid filled container comprising:
    a. at least one container containing a liquid and a bubble within the container;
    b. a circuit partly enclosed within the container;
    c. at least one incandescent bulb, connected to the circuit and enclosed within the container, to illuminate the container, the liquid and the bubble;
    d. a DC power source connected to the circuit to provide current the bulb; and
    e. a double pole-triple throw switch in the circuit to direct current flow to all of the incandescent bulbs, to interrupt current flow to all of the bulbs and to direct current flow to only one bulb from the DC power source.

14. An apparatus for illuminating a liquid filled container wherein the DC power source as described in claim 13 comprises at least one DC battery.

15. An apparatus for illuminating a liquid filled container comprising:
    a. at least one container containing a liquid and a bubble within the liquid;
    b. a circuit partly enclosed within the container;
    c. at least one LED, connected to the circuit and enclosed within the container, to illuminate the container, the liquid and the bubble;
    d. at least one DC battery connected to the circuit to provide current the LED; and
    e. a double pole-triple throw switch in the circuit to direct current flow to all of the LEDs, to interrupt current flow to all of the LEDs and to direct current flow to only one LED from the DC power source.

16. An apparatus for illuminating a liquid filled container as described in claim 15 further comprises a DC battery charger detachably connected to the circuit to charge the DC batteries.

17. An apparatus for illuminating a liquid filled container comprising:
    a. at least one container containing a liquid and a bubble within the liquid;
    b a circuit partly enclosed within the container;

c. at least one incandescent bulb, connected to the circuit and enclosed within the container, to illuminate the container, the liquid and the bubble;
d. at least one DC battery connected to the circuit to provide current the bulb; and
e. a double pole-triple throw switch in the circuit to direct current flow to all of the incandescent bulbs, to interrupt current flow to all of the bulbs and to direct current flow to only one bulb from the DC power source.

18. An apparatus for illuminating a liquid filled container as described in claim 17 further comprises a DC battery charger detachably connected to the circuit to charge the DC batteries.

19. An apparatus for illuminating a liquid filled container comprising:
    a. at least one container containing a liquid and a bubble within the liquid;
    b. a circuit partly enclosed within the container;
    c. at least one LED, connected to the circuit and enclosed within the container, to illuminate the container, the liquid and the bubble;
    d. at least one DC battery connected to the circuit to provide current the LED;
    e. a double pole-triple throw switch in the circuit to direct current flow to all of the LEDs, to interrupt current flow to all of the LEDs and to direct current flow to only one LED from the DC power source;
    f. a DC battery charger detachably connected to the circuit to charge the DC batteries; and
    g. at least one exterior LED in the circuit to project a light to illuminate an area outside the circuit.

20. An apparatus for illuminating a liquid filled container comprising:
    a. at least one container containing a liquid and a bubble within the liquid;
    b. a circuit partly enclosed within the container;
    c. at least one incandescent bulb, connected to the circuit and enclosed within the container, to illuminate the container, the liquid and the bubble;
    d. at least one DC battery connected to the circuit to provide current the bulb;
    e. a double pole-triple throw switch in the circuit to direct current flow to all of the incandescent bulbs, to interrupt current flow to all of the bulbs and to direct current flow to only one bulb from the DC power source;
    f. a DC battery charger detachably connected to the circuit to charge the DC batteries; and
    g. at least one exterior incandescent bulb in the circuit to project a light to illuminate an area outside the circuit.

21. An apparatus for illuminating a liquid filled leveling container placed within a level comprising:
    a. a level housing;
    b. at least one container, within the level housing, containing a liquid and a bubble enclosed within the liquid;
    c. a circuit partly enclosed within the container and partly within the level housing;
    d. at least one LED, connected to the circuit and enclosed within the container, to illuminate the container, the liquid and the bubble;
    e. at least one DC battery, within the level housing and connected to the circuit, to provide current the LED;
    f. a double pole-triple throw switch in the circuit to direct current flow to all of the LEDs, to interrupt current flow to all of the LEDs and to direct current flow to only one LED from the DC power source; and
    g. at least one exterior LED in the circuit to project a light to illuminate an area outside the level housing.

22. An apparatus for illuminating a liquid filled leveling container placed within a level as described in claim 21 further comprising a DC battery charger detachably connected to the circuit to charge the DC batteries.

23. An apparatus for illuminating a liquid filled leveling container placed within a level as described in claim 21 further comprising having at least one exterior LED in the circuit to project a light to illuminate an area outside the level housing.

24. An apparatus for illuminating a liquid filled leveling container placed within a level comprising:
    a. a level housing;
    b. at least one container, within the level housing, containing a liquid and a bubble enclosed within the liquid;
    c. a circuit partly enclosed within the container and partly within the level housing;
    d. at least one incandescent bulb, connected to the circuit and enclosed within the container, to illuminate the container, the liquid and the bubble;
    e. at least one DC battery, within the level housing and connected to the circuit, to provide current the bulb;
    f. a double pole-triple throw switch in the circuit to direct current flow to all of the incandescent bulbs, to interrupt current flow to all of the bulbs and to direct current flow to only one bulb from the DC power source; and
    g. at least one exterior incandescent bulb in the circuit to project a light to illuminate an area outside the level housing.

25. An apparatus for illuminating a liquid filled leveling container placed within a level as described in claim 24 further comprising a DC battery charger detachably connected to the circuit to charge the DC batteries.

26. An apparatus for illuminating a liquid filled leveling container placed within a level as described in claim 24 further comprising having at least one exterior incandescent bulb in the circuit to project a light to illuminate an area outside the level housing.

27. A method for illuminating a liquid filled container comprising:
    a. having at least one container containing a liquid and a bubble within the liquid;
    b. partly enclosing a circuit within the container;
    c. enclosing at least one LED within the container, connected to the circuit, to illuminate the container, the liquid and the bubble;
    d. connecting at least one DC battery to the circuit to provide current the LED;
    e. placing a double pole-triple throw switch in the circuit to direct current flow to all of the LEDs, to interrupt current flow to all of the LEDs and to direct current flow to only one LED from the DC power source; and
    f. detachably connecting an AC to DC battery charger to the circuit to charge the DC batteries.

28. A method for illuminating a liquid filled container comprising:

a. having at least one container containing a liquid and a bubble within the liquid;
b. partly enclosing a circuit within the container;
c. enclosing at least one incandescent bulb within the container, connected to the circuit, to illuminate the container, the liquid and the bubble;
d. connecting at least one DC battery to the circuit to provide current the bulb;
e. placing a double pole-triple throw switch in the circuit to direct current flow to all of the incandescent bulbs, to interrupt current flow to all of the bulbs and to direct current flow to only one bulb from the DC power source; and
f. detachably connecting an AC to DC battery charger to the circuit to charge the DC batteries.

29. A method for illuminating a liquid filled leveling container placed within a level comprising:
a. having a level housing;
b. placing at least one container, within the level housing, containing a liquid and a bubble enclosed within the liquid;
c. partly enclosing a circuit within the container and partly within the level housing;
d. enclosing at least one LED within the container, connected to the circuit, to illuminate the container, the liquid and the bubble;
e. connecting at least one DC battery to the circuit, within the level housing, to provide current the LED;
f. placing a double pole-triple throw switch in the circuit to direct current flow to all of the LEDs, to interrupt current flow to all of the LEDs and to direct current flow to only one LED from the DC power source;
g. detachably connecting an AC to DC battery charger to the circuit to charge the DC batteries ; and
h. using at least one exterior LED in the circuit to project a light to illuminate an area outside the level housing.

30. A method for illuminating a liquid filled leveling container placed within a level comprising:
a. having a level housing;
b. placing at least one container, within the level housing, containing a liquid and a bubble enclosed within the liquid;
c. partly enclosing a circuit within the container and partly within the level housing;
d. enclosing at least one incandescent bulb within the container, connected to the circuit, to illuminate the container, the liquid and the bubble;
e. connecting at least one DC battery to the circuit, within the level housing, to provide current the bulb;
f. placing a double pole-triple throw switch in the circuit to direct current flow to all of the incandescent bulbs, to interrupt current flow to all of the bulbs and to direct current flow to only one bulb from the DC power source;
g. detachably connecting an AC to DC battery charger to the circuit to charge the DC batteries; and
h. using at least one exterior incandescent bulb in the circuit to project a light to illuminate an area outside the level housing.

31. An apparatus for illuminating a liquid filled container, comprising:
a. at least one container containing a liquid and a bubble within the liquid;
b. a means to illuminate the container and the liquid the means to illuminate enclosed within the container of liquid to illuminate the container, the liquid and the bubble;
c. a means to selectively activate the means to illuminate operatively connected to the means to illuminate the container; and
d. a power source connected to the means to illuminate to activate the means to illuminate;
e. a means for connecting the power source, the means to selectively activate the means to illuminate, and the means to illuminate partly enclosed within the container;
f. a circuit partly enclosed within the container; and
g. means to selectively activate the means to illuminate including a double pole-triple throw switch in the circuit to direct current flow to the means to illuminate, to interrupt current flow to the means to illuminate and to direct current flow to only one of the means to illuminate.

32. An apparatus for illuminating a liquid filled container as described in claim 31 further comprises a means for charging the power source.

* * * * *